Oct. 7, 1952 — C. N. HUTCHISON — 2,612,668
METHOD FOR MAKING AND ASSEMBLING SAND MOLDS
Filed Oct. 20, 1948 — 5 Sheets-Sheet 1

INVENTOR
Clifford N. Hutchison,
BY
ATTORNEY

Oct. 7, 1952     C. N. HUTCHISON     2,612,668
METHOD FOR MAKING AND ASSEMBLING SAND MOLDS
Filed Oct. 20, 1948     5 Sheets-Sheet 3

INVENTOR
Clifford N. Hutchison
BY
ATTORNEY

Oct. 7, 1952 — C. N. HUTCHISON — 2,612,668
METHOD FOR MAKING AND ASSEMBLING SAND MOLDS
Filed Oct. 20, 1948 — 5 Sheets-Sheet 5

INVENTOR
Clifford N. Hutchison,
BY 
ATTORNEY

Patented Oct. 7, 1952

2,612,668

UNITED STATES PATENT OFFICE 2,612,668

METHOD FOR MAKING AND ASSEMBLING SAND MOLDS

Clifford N. Hutchison, Stratford, Conn., assignor to The Belknap Mfg. Co., Bridgeport, Conn., a corporation of Connecticut Application October 20, 1948, Serial No. 55,443

5 Claims. (Cl. 22—197)

This invention pertains to a system of handling mold making flasks in foundry operation involving particular sequences of steps in the method of handling such flasks and improved apparatus designed to assist in the performance of such steps, an important objective being to relieve a workman or workmen of the time consuming manual labor that heretofore has been necessary in loading drag flasks and cope flasks with sand containing the impression of a pattern and then assembling such flasks in properly mating pairs to constitute a complete mold ready to receive molten metal or other congealable substance to make a casting.

Heretofore it has been common in foundry practice to fill mold flasks with sand to which is imparted the impression of pattern contours by assigning to a single workman situated at a single work place the entire series of flask filling and flask assembling operations required to produce a completed sand mold. Each such workman must be provided with a separate supply of the various kinds of sand to be used, a stationed table for supporting and vibrating the pattern plate, a pile of empty flasks, suitable apparatus for separating the sand filled flask from the pattern plate and apparatus for bringing together mating drag and cope sections to form a complete mold. A job of this kind taxes the strength of the most hardy operator so that the output of completed mold sections per man-hour of labor is far below standards of efficiency demanded of the modern foundry.

It has been proposed heretofore to convey mold sections and the component parts used in building the same to different stations for the performing of different operations thereupon but so far as I am aware a separate and distinct pattern has been employed to make each of the mold sections and no procedure has been proposed heretofore nor apparatus known that is capable of producing the high output of molds per man-hour of labor from an assortment of variegated patterns that results from the present improved system.

An important object of the invention is to afford a monitored sequence in which empty mold flasks shall be received on respectively different pattern plates and filled with sand carrying an impression of the pattern to make mold sections which are then removed from the pattern plates at predetermined different locations spaced apart along a circuitous path of travel of the completed mold sections.

A related object is to cause drag flasks and cope flasks to be received in capping relation to parading pattern plates in such sequence that when filled with sand they will form matable drag and cope mold sections which sections in mating pairs can be separated successively from the same parading pattern plate at stations differently located in a circuitous path of simultaneous travel of both kinds of flasks. It is an object to have such separation occur in accordance with a sorting system that will assure intended cope sections being assembled with intended drag sections to form a complete mold.

A contributory object is to cause each traveling drag section of the mold to make a detour at a partially advanced stage of its travel and over a course so arranged that the detoured drag section will arrive at some later time at an assembly station where separation of a mating cope section from its pattern plate is taking place, so that properly matching flasks shall be brought together in rapidly succeeding pairs in an efficient production assembly line.

A further object is to provide apparatus useful in practicing the above methods and capable of assuring their advantageous results, which apparatus shall be automatically acting to an extent that relieves the workman from keeping track of the identity of differing kinds of mold sections and to an extent that performs by power the heavy conveying and lifting operations that heretofore have been left to manual labor.

These and other objects of the improvements will appear in greater particular from the following description of preferred ways and means for practicing the invention which description has reference to the accompanying drawings wherein:

Figs. 7 to 26, inclusive, indicate diagrammatically a typical sequence of coordinated flask loading and unloading operations resulting in high productive efficiency in use of the apparatus of Fig. 1 where an odd number of like pattern plates are circumferentially spaced on the turntable.

Typical series of steps in the loading, filling, unloading and assembling together of mold building flasks by which the system or method of the present invention may be practiced are represented diagrammatically in Figs. 7 to 26, and 27 to 45, inclusive, of the drawings. The related Figs. 1 to 6 of the drawings portray an illustrative example of apparatus that may be used as an aid in practicing such system or method. The invention will be explained conveniently by reference to such apparatus although there are many parts of the apparatus shown which could be modified or eliminated without substantial change in the method of the invention or the system of mold handling involved.

The apparatus herein shown includes a turntable 12 as an example of means to cause a plurality of pattern plates 13 to parade in a circuitous path. A roller bed track 14, for which a conveyor belt or the like might be substituted, is representative of some detour route for the sand filled flasks out about a portion of the path of circuitous travel of the pattern plates extending from a first flask unloading station or way station D to a second flask unloading station or flask assembling station C. Preferably the track 14 will extend at least part way around the edge of turntable 12 and then depart therefrom and will be spaced a sufficient radial distance from the turntable to leave room for an operator or operators to stand and work between the track and the turntable. The detour track or conveyor herein shown, for example, consists of a running length of frame 25 supporting spaced, freely turnable rollers 32 arranged in a downward gradually slanting series whereby gravity will give a coasting tendency to work resting on the rollers.

The turntable 12 is supported and turned by a vertical shaft 10 powered in any conventional manner to rotate very slowly and the top table surface may be regarded as divided circularly into nine, eight or any other suitable number of different sectors. Steadying support may be given to the rim rail 11 of the turntable by a plurality of circularly spaced freely turnable track wheels 9 pivotally supported at the tops of posts 8 stationed on the ring base 46. In each of the turntable sectors there is a pattern plate 13 fixed permanently but removably on the turntable by support brackets 24 thereby to rotate in unison with the turntable. In each of these sectors there is also a flask elevating or lifter mechanism including four upright flask lifter posts 29 which are freely slidable vertically in unison through respective guide holes in the pattern plate 13. Posts 29 are rigidly united at their bottom ends by a horizontal tie plate 34 which in its lowermost position in Figs. 2 and 3 rests on four vertically adjustable stop studs 35 carried in frame shelves 36. Shelves 36 are made rigid with turntable 12 by stiff suspension rods 37. V-guides 40 carried at the edges of tie plate 34 slidingly wipe rods 37 when the flask lifting parts move up and down.

Figure 1:
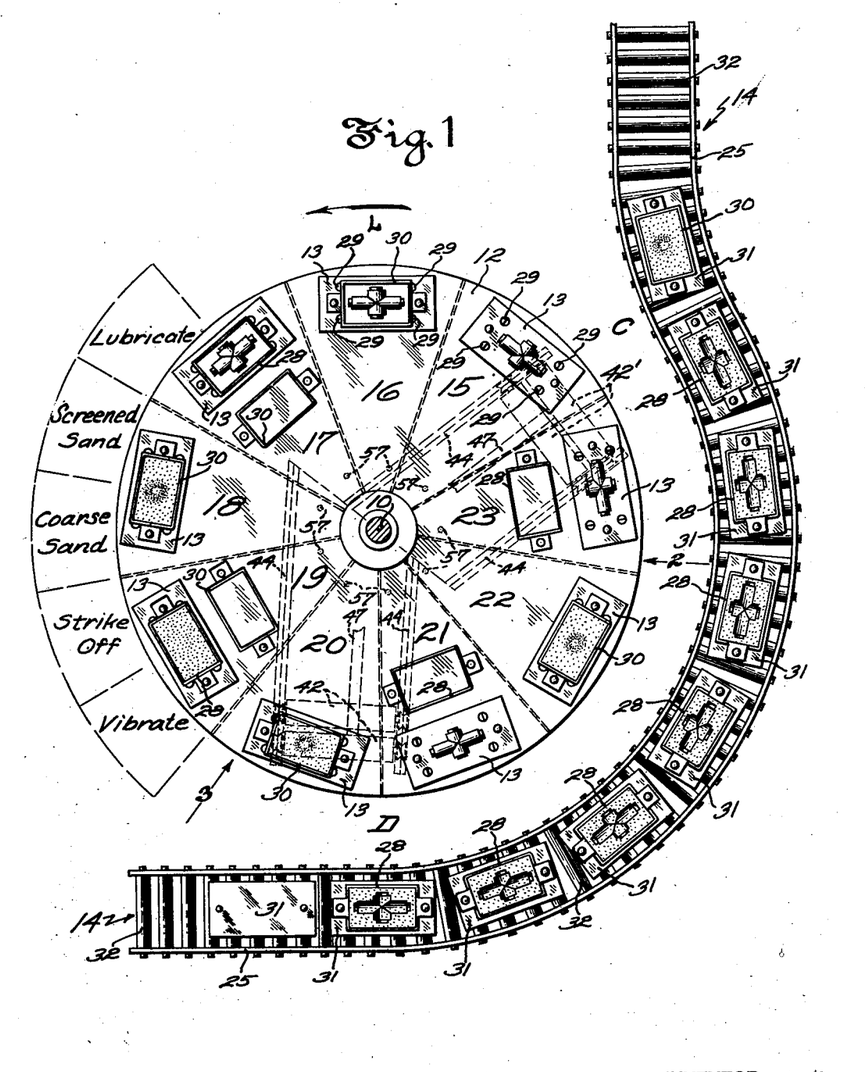
Fig. 1 is a plan view of a work carrying turntable combined with a conveyor type of roller bed track arranged in relation thereto according to the present invention in novel methods of making sand molds.
Figures 2, 3, 4:
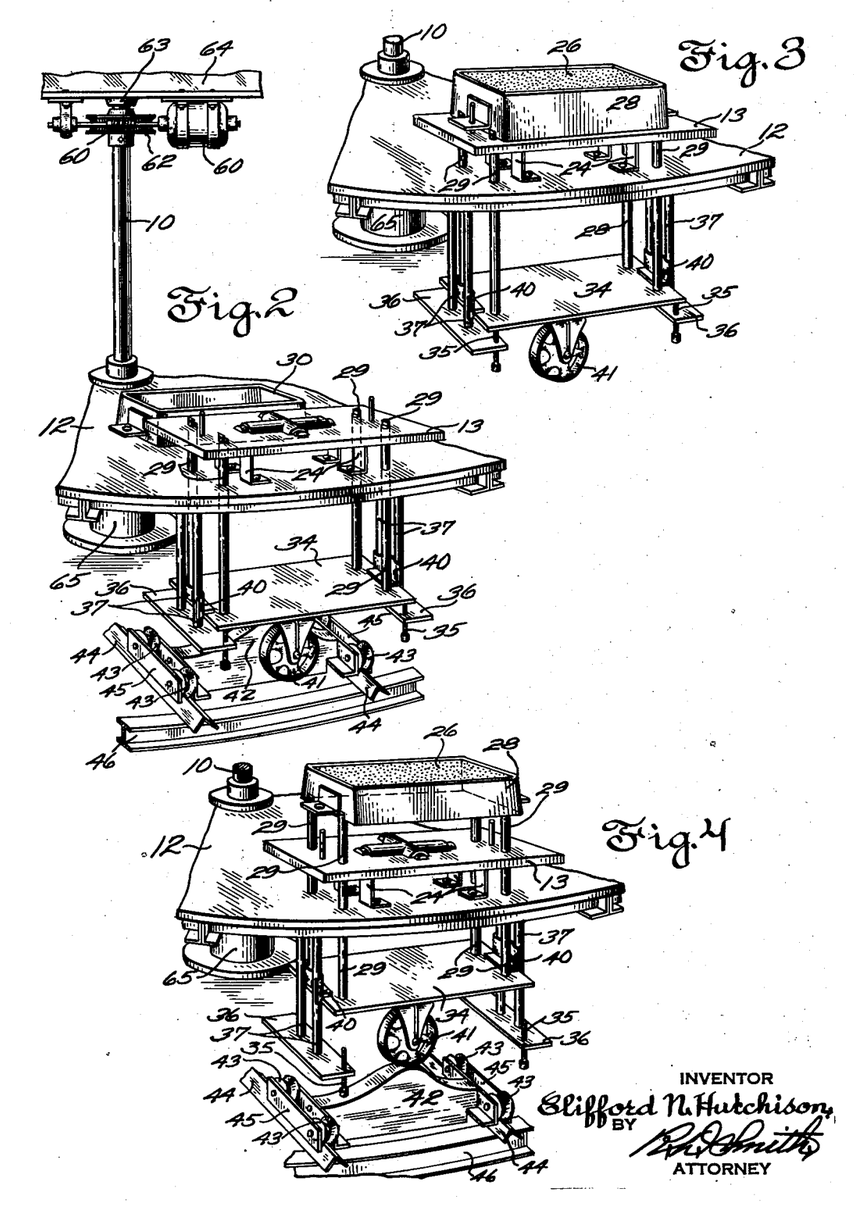
Fig. 2 is a perspective view looking at the turntable of Fig. 1 in the direction of arrow 2 in the latter figure showing a bare pattern plate thereon without the presence of mold building flasks and with the flask lifting posts lowered.
Fig. 3 is a view like Fig. 2 looking in the direction of arrow 3 in Fig. 1 showing a mold flask loaded with sand and capping the pattern plate while in the clutch of the lifter posts.
Fig. 4 is a view like Fig. 3 showing the sand filled flask lifted from the pattern plate ready to be removed from the turntable.
Figure 5:
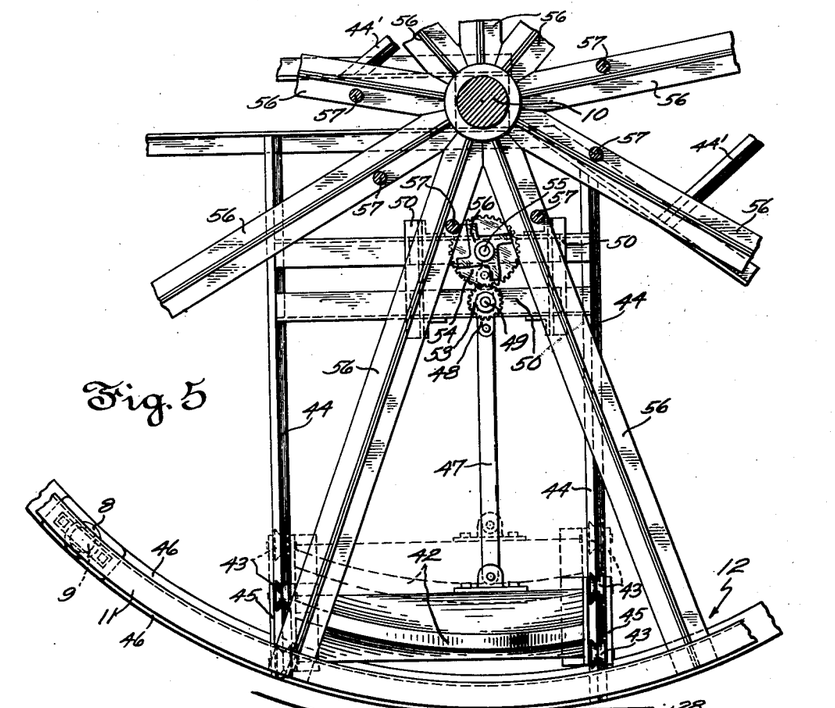
Fig. 5 is a plan view of mechanism beneath the turntable which causes the carried flasks to be lifted at predetermined unloading stations in their circuit of travel with the turntable.
Figure 6:
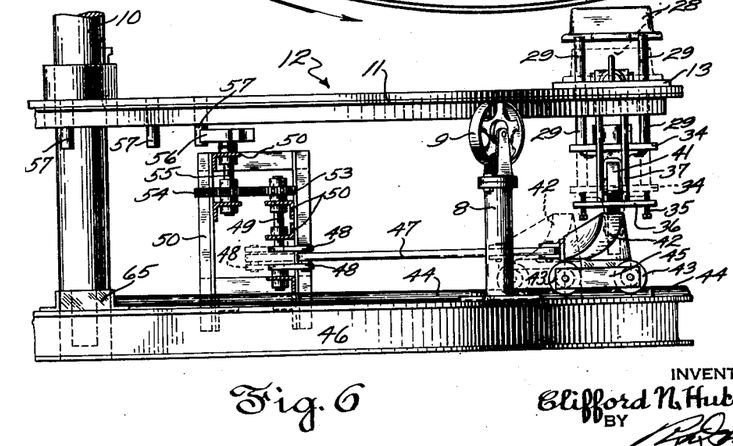
Fig. 6 shows details of reduction gearing through which the lifter operating cams are reciprocated between operative and inoperative positions and is a view looking from the left at Fig. 5.

The top ends of lifter posts 29 may be notched or otherwise adapted to receive and clutch the bottom edges of flasks 28 or 30 when the latter are positioned to cap the pattern plate so that these posts can partly underlie and at the same time steadily support any sand filled flask as it is lifted automatically from its lowered pattern capping position in Fig. 3 to its elevated position in Fig. 4 wherein it is separated from the pattern plate. In the latter position it is ready to be taken off the turntable carrying its filling of sand bearing the pattern impression.

The force that motivates the lifter posts to elevate the sand filled flask is derived from turning movement of the turntable itself whenever a caster 41 mounted on the bottom surface of elevator tie plate 34 encounters and is caused to track upward on and wheel over cam 42 or 42' forming part of the lifter raising devices. These cams are alike and each is shiftable in position along the floor in only a radial direction with respect to the center of the turntable 12. The ends of each cam are supported on wheeled carriages 45, each such carriage having two V-grooved wheels 43 which roll back and forth on rails 44 made of inverted angle irons welded in place atop the I-beam ring base 46. In Fig. 4, cam 42 is in radially outermost position which brings it within the circular path swept by caster 41 as the latter travels with the turntable whereby in passing the cam it becomes necessary for caster 41 to track uphill thereon. This causes limited upward movement of the flask lifting posts 29. In Figs. 2 and 3, on the other hand, cam 42 has been retracted to its radially innermost position which takes it out of the circular path of travel of caster 41 so that the caster can pass the cam idly without climbing it.

Cam 42 is located at the first flask unloading or way station D while cam 42' is located at the second flask unloading or drag and cope assembling station C which is spaced beyond station D counterclockwise, or in the direction of travel of the flasks with the turntable in Figs. 1, and 7 to 26, inclusive. Each of cams 42 and 42' is made to shift position radially of the pivot shaft 10 of the turntable at predetermined times in the slow rotation of the turntable by mechanism next to be explained.

Each cam is pushed and pulled radially to and fro at appropriate times by a connecting rod 47, one end of which is coupled pivotally to the cam and the other end of which is coupled pivotally to a crank 48 fixed on a shaft 49 that has rotary bearing in a gear frame 50. Shaft 49 is fixed to a driven spur gear 53. A driving spur gear 54 is in mesh with driven gear 53 and is fixed on a vertical shaft 55 which also has rotary bearing in frame 50. Shaft 55 further carries fixedly at its top end a star wheel 56, having four radial arms that are engaged and passed successively by a circular series of angularly spaced actuator pins 57 which project downward at equal radial distances from the turntable center from their fixed mountings in table spokes 56 which underlie or serve as a skeletonized top surface of the turntable. The passing of each actuator pin 57 swings the star wheel 56 at each of the aforesaid stations a quarter turn. Because the ratio of driving gear 54 to driven gear 53 is two to one, this results in a half turn of the crank 48 as each actuator pin 57 passes each of the star wheels 56. This completes half of the full excursion of its corresponding lifter raising cam 42 or 42' in a single radial direction and projects it outward to the radial position shown in Fig. 4. The engagement and passing of the next actuator pin 57 with respect to the same star wheel turns the latter a further quarter turn in the same rotary direction which reverses the direction of radial sliding movement of the lifter raising cam and completes the latter's excursion by restoring it radially inward to its position in Figs. 2 and 3. In the setup of apparatus herein illustrated, the angular spacing of actuator pins 57 is such as to cause cams 42 and 42' to move outward in unison and inward in unison so that both cams always occupy similar radial position at any given time.

Referring more particularly to Figs. 7 to 26, inclusive, a typical sequence of loading and unloading of differing drag and cope flasks from the turntable is diagrammatically represented, it being understood that a sand filled cope flask 30 which is to form the top section of a mold is designed to mate with a sand filled drag flask 28 which is to form the bottom section of the completed mold as is well understood in foundry practice. In Figs. 7 to 26, inclusive, all pattern plates are alike represented by a mere straight line, each drag flask 28 is represented by an open outlined rectangle and each cope flask 30 is represented by a solid black rectangle.

The nine sectors of the turntable are designated respectively as 15 to 23, inclusive. For ease in following the rotary progress of the sectors of the turntable in unison through a series of positions in which each sector receives certain empty flasks and is relieved of certain sand filled flasks, sector 15 of the turntable wherever appearing is shaded with cross-hatch lines.

Figures 7, 8, 9, 10, 11, 12, 13, 14, 15, 16, 17, 18, 19, 20, 21, 22:
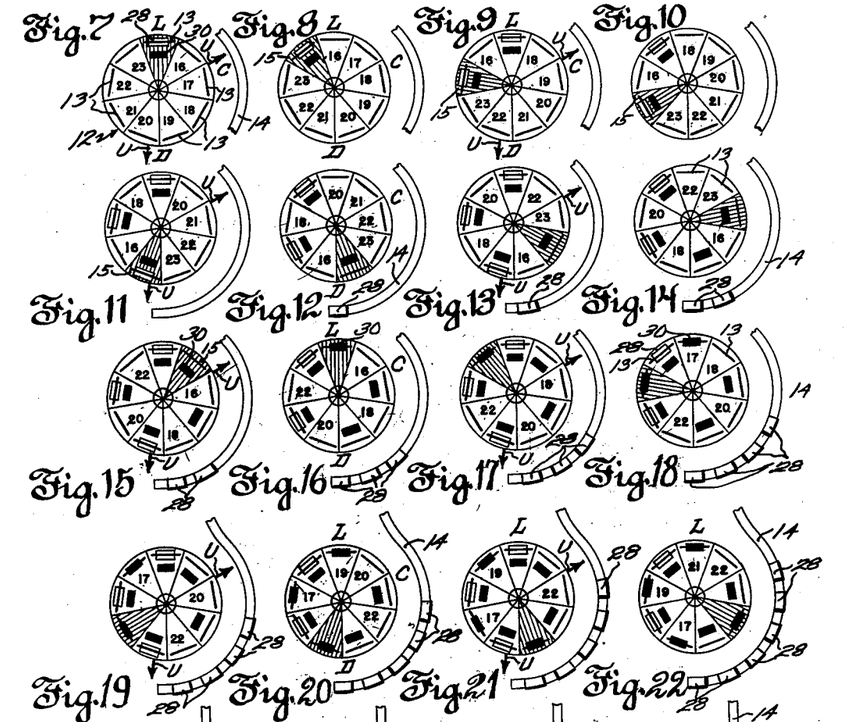
Figure 23:
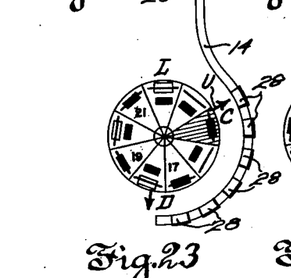

In Fig. 7 an empty drag flask 28 is placed in position to cap the pattern plate 13 of sector 15 within the clutch of the lifter posts 29 and at the same time an empty cope flask 30 may or need not be temporarily stored directly on the turntable surface in sector 15 at the side of the pattern plate opposite the workman or toward the center of the turntable for later use. In Fig. 8 the turntable is seen to have moved one-ninth of a revolution counterclockwise but for establishing a desired order in which matable mold sections shall be removed from the same pattern plate as later to appear it is desirable that on the first revolution of an empty turntable no flasks be placed upon sector 16 which is now at the loading station L. In Fig. 9 the turntable has moved two-ninths of a revolution from its starting position in Fig. 7 whereupon an empty drag flask 28 and cope flask 30 will be deposited respectively on the pattern plate 13 and on the sector surface of the turntable as was done on sector 15. As the turntable continues its very slow counterclockwise rotary advance through its series of positions shown in Figs. 10 to 15 there will take place sequentially a similar loading of empty drag flasks and cope flasks on each of alternate sectors 19, 21 and 23.

While this is happening and as flasks that rest atop a pattern plate are passing the series of processing stations labeled "Lubricate," "Screened Sand," "Coarse Sand," "Striking Off," and "Vibrating" there is successively performed on only those flasks which are carried atop a pattern plate the usual operations of dusting the bare pattern with lubricant to facilitate parting of the sand therefrom, sprinkling finely screened sand over the lubricated surface of the pattern, forceably slinging enough coarse or unscreened sand downward into the flask to fill it and pack it, striking off any excess of sand to level the filling of sand flush with the top of the flask, and then vibrating the pattern plate to loosen it from its matrix of sand just before and as the sand filled flask begins to be lifted and separated from its pattern plate.

Separation of the drag flask, full of pattern impressed sand, from the pattern plate is accomplished by the lifter posts 29 at a particular time when sector 15 is passing from its position in Fig. 11 to its position in Fig. 12. At this time both cams 42 and 42' are positioned radially outward in the path of elevator caster 41 and the drag flask lifter will be raised to separate the drag flask from its pattern plate at unloading or way station D. A corresponding condition of both cams 42 and 42' to cause lifting separation of flasks from their pattern plates will take place simultaneously at both way station D and drag and cope assembling station C and is indicated by the presence of radial arrows U in Figs. 7, 9, 11, 13, 15, 17, 19, 21, 23 and 25. In Figs. 8, 10, 12, 14, 16, 18, 20, 22, 24 and 26, on the other hand, the absence of arrows U indicates that both lifter raising cams are retracted so that there will be no lifting separation of a flask from a pattern plate at that time at either of unloading stations D or C.

Figures 24, 25:
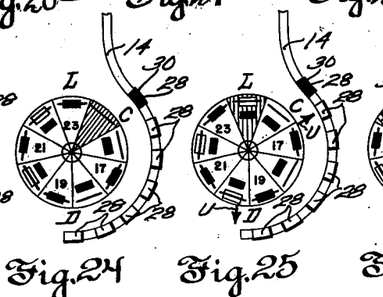
Figure 27:
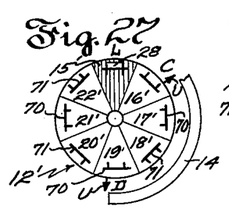
Figs. 27 to 45, inclusive, diagram a modified sequence of flask loading and unloading operations where an even number of pattern plates of unlike kinds are circumferentially spaced on the turntable.
Figure 28:
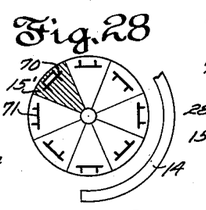
Figure 29:
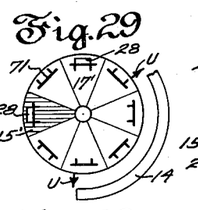
Figure 30:
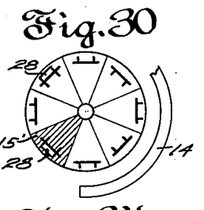
Figure 31:
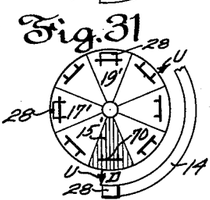
Figure 32:
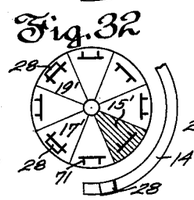
Figure 33:
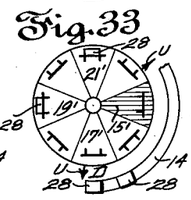
Figure 34:
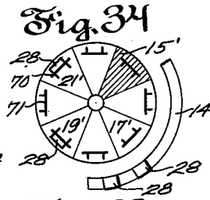
Figure 35:
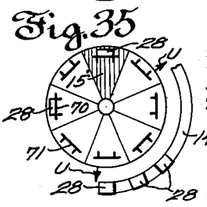
Figure 36:
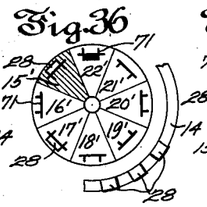
Figure 37:
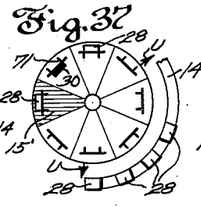
Figure 38:
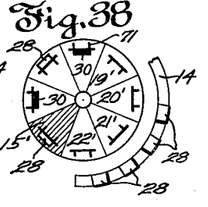
Figure 39:
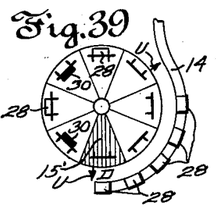
Figure 40:
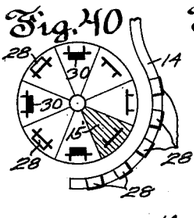
Figure 41:
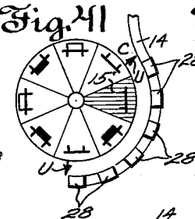
Figure 42:
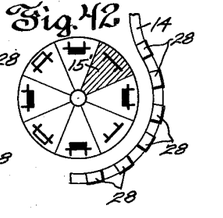
Figure 43:
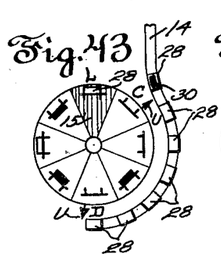
Figure 44:
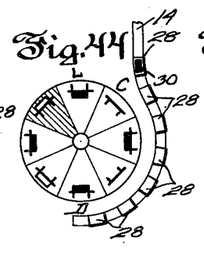
Figure 45:
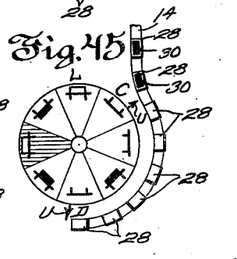

Either manually or by automatic transfer, the first sand-filled drag flask to be elevated from its upside-down position on pattern plate on sector 15 as above described is lifted across the space separating conveyor track 14 from turntable 12 and after being inverted to right-side-up position, so that the face of the sand containing the pattern impression is uppermost, is deposited on a loose follow board 31. Follow board 31 carrying the inverted right-side-up drag flask, which now is ready to form the bottom section of a complete mold, is free to coast along downhill on the rollers 32 of the conveyor track 14 from the first unloading or way station D to the second unloading or assembly station C at a speed that will bring it to the latter station by the time a cope flask becomes lifted from sector 15 at unloading station C as indicated in Fig. 24.

Turntable 12 continues rotating slowly until, as indicated in Fig. 16, sector 15 after having completed one full revolution comes again in front of loading station L. Here a workman may transfer the empty cope flask 30 from its storage position on the turntable to capping position on the pattern plate 13 so that the cope flask continues with sector 15 from its position in Fig. 16 to its position in Fig. 23 during which journey it will be filled with sand and otherwise worked on as was the drag flask hereinbefore described when passing the series of processing stations. However, at its point of travel shown in Fig. 20 the cope flask is not removed from the pattern plate as was the drag flask 28 in Fig. 11 because in Fig. 20 the absence of arrows U shows that neither of the cams 42 and 42' is in the path of the elevating caster 41. Hence the cope flask 30 on sector 15 continues past unloading station D still filled with its pattern-impressed sand until it reaches the position shown in Fig. 23 whereupon the arrows, indicating that the elevating cam 42' is in the path of elevating caster 41, show that the cope flask 30 will be removed from the pattern plate 13 at unloading station C so that it can there be transferred to the roller bed track 14.

Here the cope flask 28 is put atop the drag flask 30 that was received on the conveyor track 14 in Fig. 12, but without inverting it. Thus a complete sand mold is formed by the first made and later made mold sections herein illustrated by the assembled drag and cope mold sections when the drag and cope flask are fastened together by any conventional means (not shown). In this condition the completed mold may continue its travel by gravity down the conveyor track to any desired destination such as the metal pouring room of the foundry.

Having traced in the foregoing what happens to the first drag and cope flasks placed on sector 15 in Fig. 7, the diagrams of Figs. 7 to 26 inclusive will be self-explanative of the building up and continuous operation of the complete system of movement and processing of the mold making flasks on the turntable. Eventually, after all sectors of the turntable are simultaneously in operation, at each fractional or two-ninths turn of the turntable a cope section of the mold including its cope flask is transferred to the roller bed track at station C as indicated at Fig. 24 and finds waiting to receive it an inverted drag section of the mold including its drag flask and carrying an impression of the same pattern surface, which drag section has previously left the turntable and been deposited in inverted position on the roller bed track as in Fig. 12.

In the sequential system of operation it should be noted that for maximum efficiency of output the alternate sectors 16, 18, 20 and 22 need not begin to be loaded with empty drag and cope flasks at stations L until the loading of sectors 15, 17, 19, 21 and 23 has progressed to the stage shown in Fig. 17. Also it should be noted that the unloading of only the cope sections of the mold at station C as distinguished from the unloading of only the drag sections at station D is predetermined by a method of alternation wherein the elevating cams 42 and 42' are simultaneously presented to and retracted from the path of the elevating casters 41, not while each turntable sector passes a given point in the circuitous path, but while every other turntable sector passes a given point.

Whether the turntable be divided into 3, 5, 7, 9 or some greater uneven number of sectors, the same principle will prevail that the floor cams will be conditioned to effect lifting of the flask from the pattern plate at a time when a sector of uneven number is passing cam 42 and a sector of even number is passing cam 42'. Hence by putting flasks of any pre-selected kind on the sectors of uneven number and flasks of any differing pre-selected kind on the sectors of even number, a lifting, and if desired unloading, of the two differing kinds of flasks can be effected at respectively different unloading stations with the least amount of useless or lost motion in the movement of parts and without danger of mixup between differing kinds of mold sections that must be properly paired before they can be assembled and used as a mold.

Figs. 7 to 26, inclusive, are illustrative of a sequence of flask loading and mold section unloading operations during the building up of a capacity load of flasks and mold sections on the turntable. When this has been accomplished, as at Fig. 24, full efficiency of production will begin, namely at the time the first cope flask 28 becomes assembled with the first drag flask 30 to have been removed from the turntable after nearly two complete revolutions following the starting of work on an empty turntable.

Figs. 27 to 45 inclusive illustrate a corresponding sequence of flask loading and filling and mold section unloading operations in the working up to its capacity output stage of a turntable having an even number instead of an odd number of sectors. The capacity stage in this case occurs at Fig. 43 (corresponding to Fig. 24), or at the time of assembling the first cope flask to be removed from its pattern with the first drag flask that has formerly been removed from the same pattern plate. For purposes of simplicity, the reference characters used in Figs. 27 to 45 are like those used in Figs. 7 to 26 primed, wherefore much of the foregoing description that applies to Figs. 7 to 26 will be applicable to the diagrams in Figs. 27 to 45 if the reference characters are read as being primed. The following supplementary comment will be helpful in distinguishing certain characteristics involved in the use of an even number of sectors on the turntable as compared with the use of an odd number of sectors on the turntable. In general it may be said that the use of an odd number of sectors is well suited to a turntable full of pattern plates each of which pattern plates is used for both the cope and drag sections of a mold. On the other hand, when the pattern plate which is to form the drag section of a mold carries a different half pattern from the half pattern on the pattern plate used to form the cope section of the same mold, then it becomes necessary that a cope flask shall always be put on the cope pattern and that a drag flask shall always be put on the drag pattern. This result is facilitated and best assured where the entire circle of the turntable is occupied by an even number of equally spaced pattern plates respectively occupying the turntable sectors numbered 15' to 22' inclusive in Figs. 27 to 45. The pattern plates in these figures carry two unlike halves of the same pattern, that half producing the drag section of the mold being designated as a drag pattern 70, and that producing the cope section of the mold being designated as a cope pattern 71. The drag flasks 28 and cope flasks 30 may be like those in Figs. 1 to 26. The lifter raising cams 42 and the track rails 44 along which they shift position radially of the turntable remain positioned as shown in broken lines in Fig. 1 and indicated by arrows U in Figs. 7 to 45. This is also true of the loading station L, the way station D, and the mold section assembling station C. It is also true of the processing stations termed "Lubricate," "Screened Sand," "Coarse Sand," "Striking Off" and "Vibrate." Hence every flask that travels from station L to station D will become loaded with sand modeled with impression of its proper pattern.

As in Figs. 7 to 26 the appearance or absence of arrows U in Figs. 27 to 45 makes clear that only the drag sections of the mold will be separated from the pattern plate at section D while only the cope sections of the mold will be separated from the pattern plate at station C owing to the alternation of the drag and cope flasks as loaded on the turntable sectors during the building up of an empty turntable to capacity loaded output and to the modified particular placements of cams 42 relative to each other about the circle of the turntable.

The advantages of this method of loading an initially empty machine is that it gives time for six drag flasks to have become discharged from the turntable before a cope flask will become discharged, whereby the first drag flask to be discharged at way station D is given comfortable time to arrive at or be transported to assembly station C before the first cope flask is separated from its pattern plate at the latter said station ready for assemblage with the drag flask. It will be observed that whereas six removed drag flasks occupy the distance on roller track 14 between station D and station C, this same distance nevertheless is occupied by only three of the pattern carrying sectors of the turntable. This means that the travel of a drag flask from station D to station C along the detour route of roller bed track 14 may consume twice the time that will be taken by the pattern plate from which it has been parted to reach assembly station C.

While practically all of the steps comprising the present improvements in method might be performed manually without the use of machinery or apparatus supplied with power with corresponding advantages in the setting up and continued operation of a high speed production line of completed sand molds, the particular machinery and apparatus which has herein been described for illustrative purposes possesses inventive features in its structure which assist in carrying out the methods referred to and both such methods and machines or apparatus go to make up a system of preparing and assembling sand mold sections which can be practiced and embodied with considerable departure from the exact details of the ways and means herein described, wherefore the appended claims are directed to and intended to cover all fair equivalents for the method steps and apparatus structures that fall within the broadest interpretation of the language used in the claims.

I claim:

1. The method of preparing a succession of various sand molds for casting articles of differing shapes with the aid of patterns carried by a conveyor along a closed path serially past a way station and past an assembly station, which includes the steps of, placing upon the conveyor a series of unlike patterns, placing upon individual patterns of said series the first flask of a pair of mating drag and cope flasks, filling said first flasks with sand as a first operation whereby to form in the individual first flasks the first made section of a pair of mating mold sections, sequentially removing the first made mold sections from their patterns at said way station in such quantity as to exceed the number of patterns occupying said path between said stations, advancing said removed first made mold sections to said assembly station by a route in detour relation to said path, advancing empty patterns from which said first made mold sections have been removed farther along said path past said assembly station, placing respectively upon said farther advanced empty patterns the second flasks of said pair of mating flasks, filling said second flasks with sand as a second operation whereby to form in the individual second flasks a later made section of said pair of mating mold sections, advancing said later made mold sections past said way station along said path to said assembly station, removing said later made mold sections from their patterns successively at said assembly station in the same sequence as said first made mold sections were removed previously from their respective patterns at said way station, and sequentially assembling said removed later made sections respectively with their mating first made mold sections previously removed from the same respective patterns at said way station, whereby each mold section made from a pattern in said first operation becomes assembled with a mold section subsequently made from the same pattern in said second operation.

2. The method of preparing a succession of various sand molds for casting articles of differing shapes with the aid of patterns carried by a conveyor along a closed path serially past a way station and past an assembly station, which includes the steps of, placing upon the conveyor a series of unlike patterns, placing upon individual patterns of said series the drag flask of a pair of mating drag and cope flasks, filling said drag flasks with sand as a first operation whereby to form in the individual drag flasks the drag section of a pair of mating mold sections, sequentially removing the drag sections from their patterns at said way station in such quantity as to exceed the number of patterns occupying said path between said stations, advancing said removed drag sections to said assembly station by a route in detour relation to said path, advancing empty patterns from which said drag sections have been removed farther along said path past said assembly station, placing respectively upon said farther advanced empty patterns the cope flasks of said pair of mating flasks, filling said cope flasks with sand as a second operation whereby to form in the individual cope flasks the cope section of said pair of mating mold sections, advancing said cope sections past said way station along said path to said assembly station, removing said cope sections from their patterns successively at said assembly station in the same sequence as the mating drag sections were removed previously from their respective patterns at said way station, and sequentially assembling said removed cope sections respectively with their mating drag sections previously removed from the same respective patterns at said way station, whereby each drag section made from a pattern in said first operation becomes assembled with a cope section subsequently made from the same pattern in said second operation.

3. The method of preparing a succession of various sand molds for casting articles of differing shapes with the aid of patterns carried by a conveyor along a closed path serially past a way station and past an assembly station, which includes the steps of, placing upon the conveyor a series of patterns, placing upon individual patterns of said series the drag flask of a pair of mating drag and cope flasks, filling said drag flasks with sand as a first operation whereby to form in the individual drag flasks the drag section of a pair of mating mold sections, sequentially removing the drag sections from their patterns at said way station in such quantity as to exceed the number of patterns occupying said path between said stations, advancing said removed drag sections to said assembly station by a route in detour relation to said path, advancing empty patterns farther along said path past said assembly station, placing respectively upon said farther advanced empty patterns the cope flasks of said pair of mating flasks, filling said cope flasks with sand as a second operation whereby to form in the individual cope flasks the cope section of said pair of mating mold sections, advancing said cope sections past said way station along said path to said assembly station, removing said cope sections from their patterns successively at said assembly station in the same sequence as the mating drag sections were removed previously from their respective patterns at said way station, and sequentially assembling said removed cope sections respectively with their mating drag sections previously removed at said way station, whereby each drag section made in said first operation becomes assembled at said assembly station with its mating cope section made in said second operation while an additional drag section is being removed simultaneously from its pattern at said way station.

4. The method of preparing a succession of various sand molds for casting articles of differing shapes with the aid of patterns carried by a conveyor along a closed path serially past a way station and past an assembly station, which includes the steps of, placing upon the conveyor a series of patterns, placing respectively upon unlike individual patterns of said series the drag flask and the cope flask of a pair of mating flasks, filling said drag flasks with sand as a first operation whereby to form in the individual drag flasks the drag section of a pair of unlike mating mold sections, sequentially removing the drag sections from their patterns at said way station in such quantity as to exceed the number of patterns occupying said path between said stations, advancing said removed drag sections to said assembly station by a route in detour relation to said path, advancing empty patterns farther along said path past said assembly station, placing respectively upon said farther advanced empty patterns the cope flasks of said pair of mating flasks, filling said cope flasks with sand as a second operation whereby to form in the individual cope flasks the cope section of said pair of unlike mating mold sections, advancing said cope sections past said way station along said path to said assembly station, removing said cope sections from their patterns successively at said assembly station in the same sequence as the differing mating drag sections were removed previously from their respective patterns at said way station, and sequentially assembling said removed cope sections respectively with their differing mating drag sections previously removed at said way station, whereby each drag section made in said first operation becomes assembled at said assembly station with its differing mating cope section made in said second operation while an additional drag section is being removed simultaneously from its pattern at said way station.

5. The method of preparing a succession of various sand molds for casting articles of differing shapes with the aid of patterns carried by a conveyor along a closed path serially past a way station and past an assembly station, which includes the steps of, placing upon the conveyor a series of patterns, placing upon individual patterns of said series the drag flask of a pair of mating drag and cope flasks, filling said drag flasks with sand as a first operation whereby to form in the individual drag flasks the drag section of a pair of mating mold sections, sequentially removing the drag sections from their patterns at said way station, advancing said removed drag sections to said assembly station by a route in detour relation to said path, advancing empty patterns farther along said path past said assembly station, placing respectively upon said farther advanced empty patterns the cope flasks of said pair of mating flasks, filling said cope flasks with sand as a second operation whereby to form in the individual cope flasks the cope section of said pair of mating mold sections, advancing said cope sections past said way station along said path to said assembly station, removing said cope sections from their patterns successively at said assembly station in the same sequence as the mating drag sections were removed previously from their respective patterns at said way station, and sequentially assembling said removed cope sections respectively with their mating drag sections previously removed at said way stations, whereby each drag section made in said first operation becomes assembled at said assembly station with its mating cope section made in said second operation while an additional drag section is being removed simultaneously from its pattern at said way station.

CLIFFORD N. HUTCHISON.

REFERENCES CITED

The following references are of record in the file of this patent:

UNITED STATES PATENTS

| Number | Name | Date |
| --- | --- | --- |
| 745,649 | McWane | Dec. 1, 1903 |
| 1,579,145 | Reed | Mar. 30, 1926 |
| 1,850,018 | Leyondre | Mar. 15, 1932 |
| 1,911,542 | Wurster | May 30, 1933 |
| 2,013,278 | Luton | Sept. 3, 1935 |
| 2,048,190 | Linabury | July 21, 1936 |
| 2,049,967 | Luton | Aug. 4, 1936 |
| 2,068,835 | Wurster | Jan. 26, 1937 |
| 2,368,718 | Miller | Feb. 6, 1945 |